INVENTOR.
GEORGE R. SANTANA
BY
ATTORNEY 3,206,689
PULSE SIGNAL AGC CIRCUITRY

George Robert Santana, San Jose, Calif., assignor to International Business Machines Corporation, New York, N.Y., a corporation of New York Filed June 29, 1961, Ser. No. 120,715
6 Claims. (Cl. 328—173)

The invention relates to electric pulse signal translating circuitry for maintaining substantially constant amplitude output from an amplitude varying pulse signal input, and it particularly pertains to such circuitry for translating a pulse signal of intermittent nature, that is, having relatively long time intervals during which the signal is absent.

In data processing systems it is conventional to store data in a number of ways including storing on continuously moving or rotating magnetic surfaces for subsequent use. There are known storage devices comprising magnetic surfaces laid down on rotating disks or drums, any of a series of closed paths or tracks of which may be utilized by either electrically selecting one of a plurality of transducers in fixed relationship to the track associated therewith or by mechanically moving a single transducer to a selected position adjacent the moving magnetic surface. Each of the magnetic tracks may be further divided into sectors, and the sectors may have gaps therebetween.

In reproducing information from such storage devices, signals may comprise a series of voltage pulses indicative of the binary digits or "bits," as each sector is scanned by the transducer interrupted by relatively long intervals of signal absence when the system is idling or the transducer encounters gaps between the sectors. Furthermore, the amplitude of these signals reproduced may vary for several reasons. One reason for variation is that in the case of a plurality of transducers, the transducers that are selected from time to time have slightly different characteristics. Another reason is that in the case of single transducers positioned to select tracks differentially, the inherent and inescapable positioning error may cause an amplitude variation in reproduced voltage pulses. In the case of disk files, the more important reason is that the linear speed of the inner tracks varies considerably with respect to the outer racks even though the associated timing circuitry of the data processing system maintains the pulse recurrence frequency or pulse repetition rate substantially constant.

Because it is highly desirable that the output signal level be of substantially constant amplitude, it is conventional for data reproducing and amplifying circuitry to incorporate automatic gain controlling (AGC) circuitry. Such circuitry, usually in the form of a negative feed-back loop, in which output signals are sampled and the gain of one or more of the amplifier stages is reduced when the signals are too strong or the gain is increased when the signals become too weak. Automatic gain control circuitry is well known for situations in which the signal to be amplified is substantially periodic and uninterrupted, however, as pointed out before, in data processing systems it is both necessary and desirable that there be gaps in the signals. When a magnetic tranducer encounters such gap on the magnetic surface, the resulting interval of no signal, if prolonged to any extent, will cause the conventional AGC circuitry to bias the amplifier into maximum gain condition, due to which the next signal reproduced from the following sector of the recording track will be unduly amplified and thereby distorted.

An object of the invention is to provide automatic gain control AGC circuit capable of maintaining the output from a pulse signal translating circuit at substantially constant amplitude and of holding the gain of the amplifier in the absence of signal pulses over a prolonged period of time at the level last set.

Another object of the invention is to provide improved AGC circuitry having a relatively short time constant in the presence of pulse signal and having a relatively long time constant in the absence of pulse signal.

A further object of the invention is to provide an amplifying circuit arrangement with a AGC circuitry capable of smoothing out signal modulation by having a relatively short time constant in the presence of pulse signal.

According to the invention, an electric pulse signal translating circuit is provided with automatic gain controlling circuitry comprising a diode element shunted across the translating circuit to vary the impedance presented to the signal in response to an AGC potential derived in a circuit including an error voltage detector coupled to the output of the translating circuit output and coupled to an error voltage storing circuit comprising a resistor and capacitor connected in series and having a short time constant for developing an AGC potential quickly in response to applied pulse signal, a discharging circuit comprising a resistor shunted across the error voltage storing circuit capacitor, a comparing circuit having one input coupled across the error voltage storing circuit and another input connected to a source of reference potential, and means to apply the resulting AGC voltage to the diode element shunted across the translating circuit for varying the impedance offered thereby to the signal.

Transients appearing in the translating circuitry due to switching of the other components of the data processing system in which the AGC circuitry is incorporated are accompanied by a gain resetting sequence which starts by shunting the charge storing circuit with a charge dissipating element preferably in the form of a transistor, having an input circuit to which predetermined potential is applied in normal operation for presenting a very high impedence across the charge storing circuit and another predetermined potential is applied to the input of the charge dissipating element in synchronism with the switching of the data processing system whereby the error voltage charge is dissipated at the time of switching and thereby the translating circuit is reset to maximum gain.

With the circuit arrangement thus described, the desired output pulse amplitude is obtained on the very first data pulse translated by previously recording a regularly occurring group of pulses at the fundamental repetition rate and charging the AGC error voltage charge storing capacitor to the desired value before the translating circuit passes the very first data pulse.

The resetting circuit actually increases the gain to maximum. Normally a large signal transient from switching transducers would cause a gain reduction to the minimum level. However, it is more desirable to recover from a maximum gain condition than a minimum gain condition. The recovery is faster, and the possibility of losing the first few bit signal pulses is eliminated.

Further according to the invention, the gain of the translating circuit is regulated according to the amplitude of each pulse. This is accomplished by reducing the charging circuit to a very short time constant and interposing an additional discharging circuit, intermediate the charging and discharging circuits already present, which is switched into the circuitry only in the presence of a signal pulse. In such manner the error voltage is independent of pulse repetition rate; at least over a very wide range of pulse repetition rates, since both charge and discharge of the error voltage storing capacitor occurs during each signal pulse. The added discharging circuit comprises an electron flow controlling device, preferably a transistor, which is turned off completely in the absence of signal so that the gain of the translating circuit is maintained at essentially the same value as it was during the previous signal pulse or until the charge stored in the charge storing capacitor leaks off through the charge dissipating shunt resistor, or a new signal pulse appears. For changes in signal amplitude, however, the net result is the difference between charging and discharging, so that the charge on the error voltage storing capacitor changes rapidly with signal amplitude variations.

In order that the more practical aspects of the invention may readily be realized, several embodiments, given by way of examples only, are described hereinafter with reference to the accompanying drawing, forming a part of the specification, in which.

Figure 1:
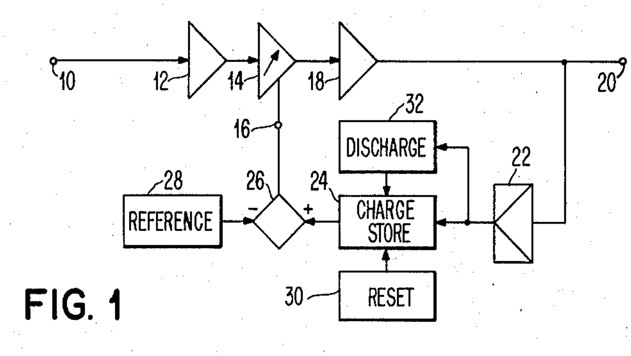
FIG. 1 is a functional diagram of a pulse signal amplifying system with automatic gain control circuitry according to the invention.

In FIG. 1 there is shown a functional diagram of a pulse signal translating system with AGC according to the invention. An input pulse signal of varying amplitude and substantially constant fundamental repetition rate is applied at input terminals 10 as from a magnetic transducer reproducing signals recorded in the form of a magnetic film on a moving tape or rotating disk. It should be clearly understood that as used herein the term "fundamental repetition rate" is construed as the timing rate at which pulses are processed in the associated data processing system regardless of the absence of possible pulses resulting from imparting information onto the pulse signal train. The pulse signals at the input terminals 10 are translated in a form of apparatus shown as a preamplifier 12 followed by a variable gain amplifier 14 having tertiary terminals 16 at which automatic gain control (AGC) voltage is applied for varying the gain of the variable gain amplifier 14 and an output amplifying stage 18 connected to output terminals 20. An AGC error voltage detecting circuit 22 is coupled to the output terminals 20 for developing an unidirectional voltage proportional to the amplitude of the pulse signals at the output terminals 20. This unidirectional voltage is applied to an error voltage storing circuit 24 having a predetermined charging time constant and a much longer discharging time constant. The output of the error voltage storing circuit 24 is applied to a voltage comparing circuit 26 to which there is also applied an AGC reference voltage from a suitable source 28 to produce a control voltage which is applied to the teriary AGC terminals 16 to vary the gain of the variable gain amplifier 14 inversely as the amplitude of the output signal pulses at the output terminals 20.

The automatic gain controlling voltage circuitry according to the invention is rendered relatively unaffected by transients appearing in the translating circuit between the input terminals 10 and the output terminals 20 due to switching of the data processing system in which the above described circuitry is incorporated, or from abrupt "on-track" or "off-track" reproduction in initially locating the transducer, by means of a resetting circuit 30 coupled to the error voltage storing circuit 24; which resetting circuit 30 is operated in synchronism with the switching of the data processing system. With the circuitry thus described, the automatic gain control voltage applied at the AGC terminal 16 is made to vary rapidly with the signal pulses appearing at the output terminals 20 and in order to ensure that the very first data pulse produced by the system in the data processing system is properly handled despite "on-track" and "off-track" variations, a group of regularly occurring pulses at the fundamental pulse repetition rate are recorded on the magnetic medium preceding the recording of the data pulses for the purpose of building up the AGC voltage on pulses recorded under the same conditions. According to one form of the invention, improved results are attained without the need for such specific AGC pulses by means of an additional discharging circuit 32. The charging circuit time constant of the AGC error voltage storing circuit 24 is made very rapid and the discharging circuit 32 is arranged to be switched on only in the presence of signal pulses appearing at the output terminals 20 which are repeated at the output of the detector circuit 22.

Figure 2:
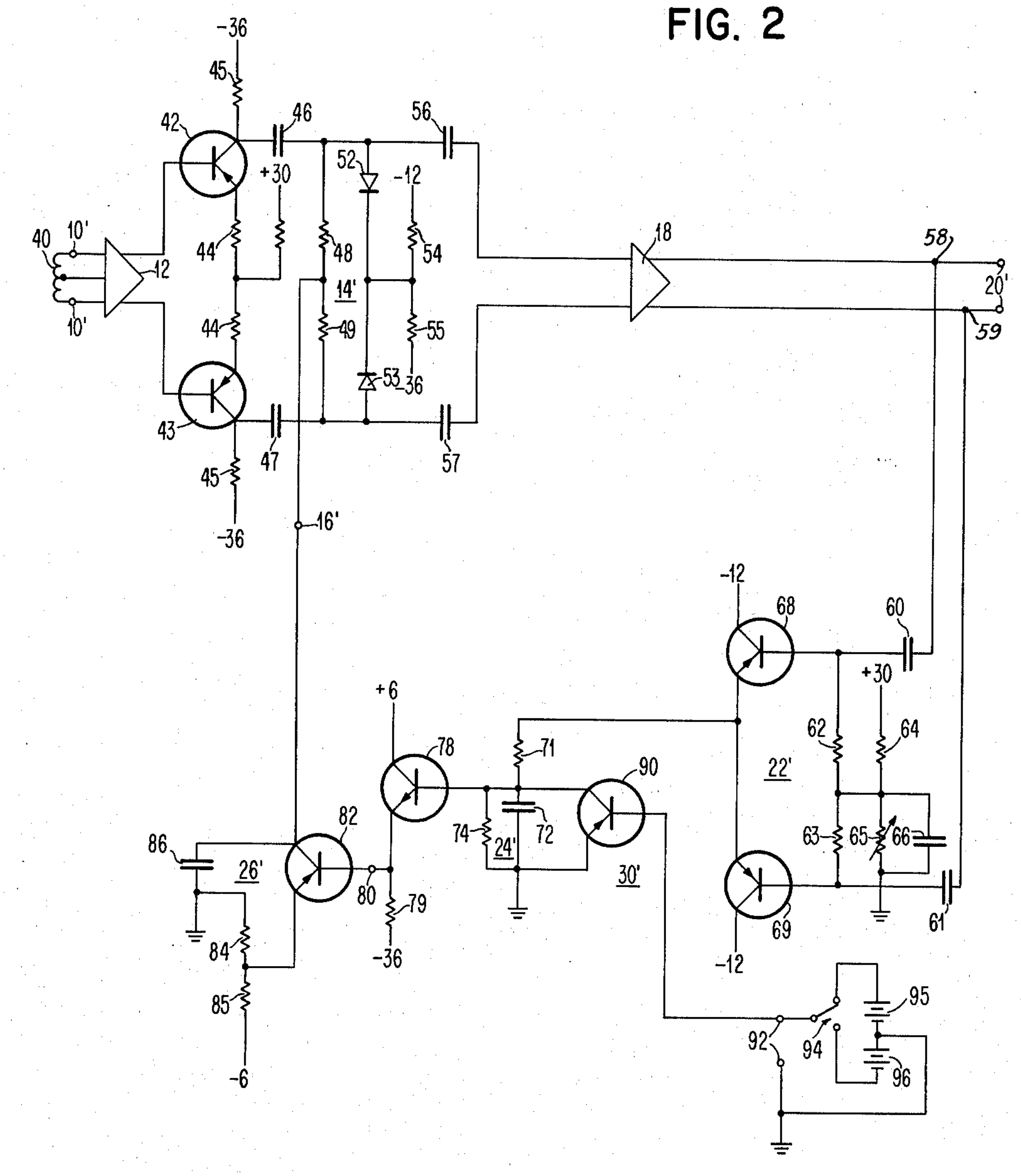
FIG. 2 is a schematic diagram of one embodiment of AGC circuitry according to the invention.

In FIG. 2 there is shown a schematic diagram of a pulse signal amplifying system with automatic gain control (AGC) circuity according to the invention. A differential voltage signal generated in a magnetic record reproducing transducer 40 is applied to the input terminals 10' of a preamplifier stage 12, in practice having a gain of the order of 2. The output of the preamplifier stage 12 is applied to the variable gain amplifier 14' comprising a pair of transistors 42 and 43 connected in common emitter configuration. To a first approximation the gain of this stage 14 is the quotient of the differential collector impedance divided by the differential emitter impedance. The alternating component of the differential signal appearing at the collector electrodes is applied by coupling capacitors 46 and 47 to an impedance varying circuit comprising a pair of shunt resistors 48 and 49 and a pair of shunt diodes 52 and 53 returned to a point of negative reference potential by means of a pair of voltage dividing resistors 54 and 55. In normal operation, the diodes small signal impedance is small compared with the impedance of all other collector resistors, so, the gain of the variable gain amplifier stage is approximately equal to the quotient of the resistance of the diode 52 (or 53) divided by the resistance of the emitter circuit resistor 44 (or 45). The resistance of the diodes 52 and 53 is inversely related to the direct current flowing through the diodes, whereby the gain of the stage varies inversely with the diode direct current which is made to vary according to the invention by the application of an AGC voltage between the emitter of the transistor 82 and a point of fixed reference potential shown as —36 volts. The output alternating component of the differential signal is applied by means of coupling capacitors 56 and 57 to a further amplifier stage 18, in practice having a gain in the order of 800, the differential output signal of which appears at the output terminals 20'.

The alternating components of the differential output signal at the output terminals 20 is applied by means of a pair of coupling capacitors 60 and 61 to the AGC error voltage rectifying circuit 22 comprising a pair of transistors 68, 69 connected in common emitter configuration. The input signal is referenced by the base circuitry of the transistors 68 and 69 which are arranged to provide full wave rectification. The emitter electrodes are connected in common through a charging resistor 71 to an error voltage storing capacitor 72 in the charge storing circuit 24'. The capacitor 72 is charged rapidly as the resistance of the charging resistor 71 is made small to provide a short time constant for the charging circuit. In the absence of charging potential, a shunt resistor 74 connected across the charge storing capacitor 72 is effective to discharge the capacitor. The resistance value of the discharging resistor 74 is made very much larger than that of the charging resistor 71 so that the voltage across the charge storing capacitor 72 will follow the peaks of the rectified signal, as long as decreases in signal strength do not occur more rapidly than the discharging capacitor can follow. This discharge rate, however, cannot be made too rapid since it is desired to keep the amplifier gain, and hence the capacitor voltage, fairly constant over both gaps and signal. The error voltage stored in the error voltage storing capacitor 72 is applied to a base of an input transistor 78 connected in emitter follower configuration from which a positive potential is developed across the emitter resistor 79 presented between terminals 80 and grounded point of fixed reference potential. The emitter follower configuration is used to isolate the detection circuitry from the voltage comparing circuit 26 comprising a common emitter connected transistor 82 to the base of which the error voltage is applied. By means of a voltage divided comprising a pair of resistors 84 and 85 fixed negative reference potential is applied to the emitter of the voltage comparing transistor 82. The difference between the reference voltage and the error voltage causes a proportional current to flow through the collector electrode circuit of the comparing transistor 82 providing an automatic gain controlling current at the terminal 16 to flow through the diodes 52 and 53 to change the dynamic impedance thereof. Hence, a large error signal causes the diode impedance to be reduced which then reduces the gain of the variable gain amplifier 14'.

An AGC resetting transistor 90 having emitter and collector electrodes connected to opposite terminals of the charge storing capacitor 72 used to discharge the capacitor 72 to ground when large switching transients feed through the amplifiers 12, 14 and 18. Resetting voltages are applied at terminals 92 in synchronism with the switching in the associated processing system. This switching potential may be obtained in many ways known to those skilled in the art and as shown here as being obtained from manipulation of a switch 94 in synchromism with the switching of the other data processing components and batteries 95 and 96 simulating positive and negative potential output from associated circuity. Obviously a trigger pulse may be generated in response to the switching for short circuiting the charge storing capacitor 72 momentarily, by an impedance of 10 to 40 ohms or, when the data processing system is in the writing condition a positive write gate potential may be applied steadily to the resetting transistor 90 whereby the charge storing capacitor 72 is continuously short circuited until such time as reproduction from the magnetic record is desired and then the write gate is turned off and negative potential is applied at the terminals 92 to present a relatively high impedance across the charge storing capacitor 72.

As stated previously it is desired to keep the amplifier gain maintained fairly constant over gaps as well as signals and hence, the error voltage also is desired to be maintained fairly constant. According to the invention, rapid following characteristics and constant gain over gaps is attained by means of the discharge circuit 32 shown in FIG. 3 which is arranged to be operating only when the signal is present and to remain idle during signal gaps. The differential output signal appearing at terminals 58 and 59 is applied by means of coupling capacitors 60 and 61 to the detector circuit 22'. A pair of resistors 62 and 63 reference the amplified output signal to ground for application to the base electrodes of rectifier transistors 68' and 69' which are arranged to provide full wave rectification at the junction of the emitter electrodes. A pair of resistors 102 and 103 are used to reference the negative signal for application through an emitter follower circuit isolating transistor 104 a charging resistor 71' to a charge storing capacitor 72. In practice, the storing capacitor 72 is charged to a negative value of the order of 2 volts. The isolating transistor 104 charges the capacitor 72 when the base voltage becomes negative with respect to ground. When the base voltage of the isolating transistor 104 becomes positive with respect to the voltage at a given instant on the charge storing capacitor 72, the isolating transistor 104 is back biased and the charge storing capacitor 72 is discharged through the shunt discharging resistor 74. If the shunt resistor 74 is given a value very much larger than that of the charging resistor 71' the voltage across the charge storing capacitor 72 will follow along the peaks of the rectified signal, as long as the decrease in signal strength does not occur more rapidly than the time constants of the circuit will permit the charge storing capacitor 72 to follow. To provide rapid following characteristics and at the same time maintain the capacitor voltage substantially constant over large signal gaps, the output potential of the rectifier transistors 68' and 69', upon being referenced by a pair of resistors 106 and 107, is applied to a diode switching element 108 so that when the anode of the diode switching element 108 goes negative with respect to ground, a normally conducting transistor 112 is turned off. This, in turn, turns off a normally conducting transistor 116 having the emitter electrode connected in common to the emitter electrode of a discharging transistor 118. The turning off of the common connected transistor 116 turns the discharging transistor 118 on causing a discharge current to flow through the collector electrode and charge the charge storing capacitor 72 positively. In effect, this discharges the negative voltage with which the capacitor 72 is being charged by the signal. In the absence of signal pulses, the anode of the switching element diode 108 goes positive with respect to ground causing the cascaded transistors 112 and 116 to conduct and turn the discharging transistor 118 off.

Thus each signal pulse will contribute a negative charge to the charge storing capacitor 72 through the emitter follower isolating transistor 104 and a positive, effectively discharging, charge through the discharging transistor 118. However, the parameters of the circuits are predetermined so that the capacitor 72 is more negatively charged than the discharge transistor 118 can draw off. If the signal now drops in strength to a value predetermined as desirable for the ambient conditions of operation, say 50%, the isolating transistor 104 will be back biased and cannot allow negative charging of the capacitor 72 to build up, but the discharging transistor 118 is still discharging because the threshold of operation for this circuit is set at a value less than 50%. The nominal signal amplitude by the values chosen for the voltage dividing resistors 106 and 107; for example 40% with the values given hereinafter. Hence, the gain of the amplifier, in proportion to the error correcting voltage, is increased very rapidly. If the signal is lost completely the discharging transistor 118 will be off and the charge storing capacitor 72 will discharge with a very long time constant through the discharging resistor 74.

Figure 3:
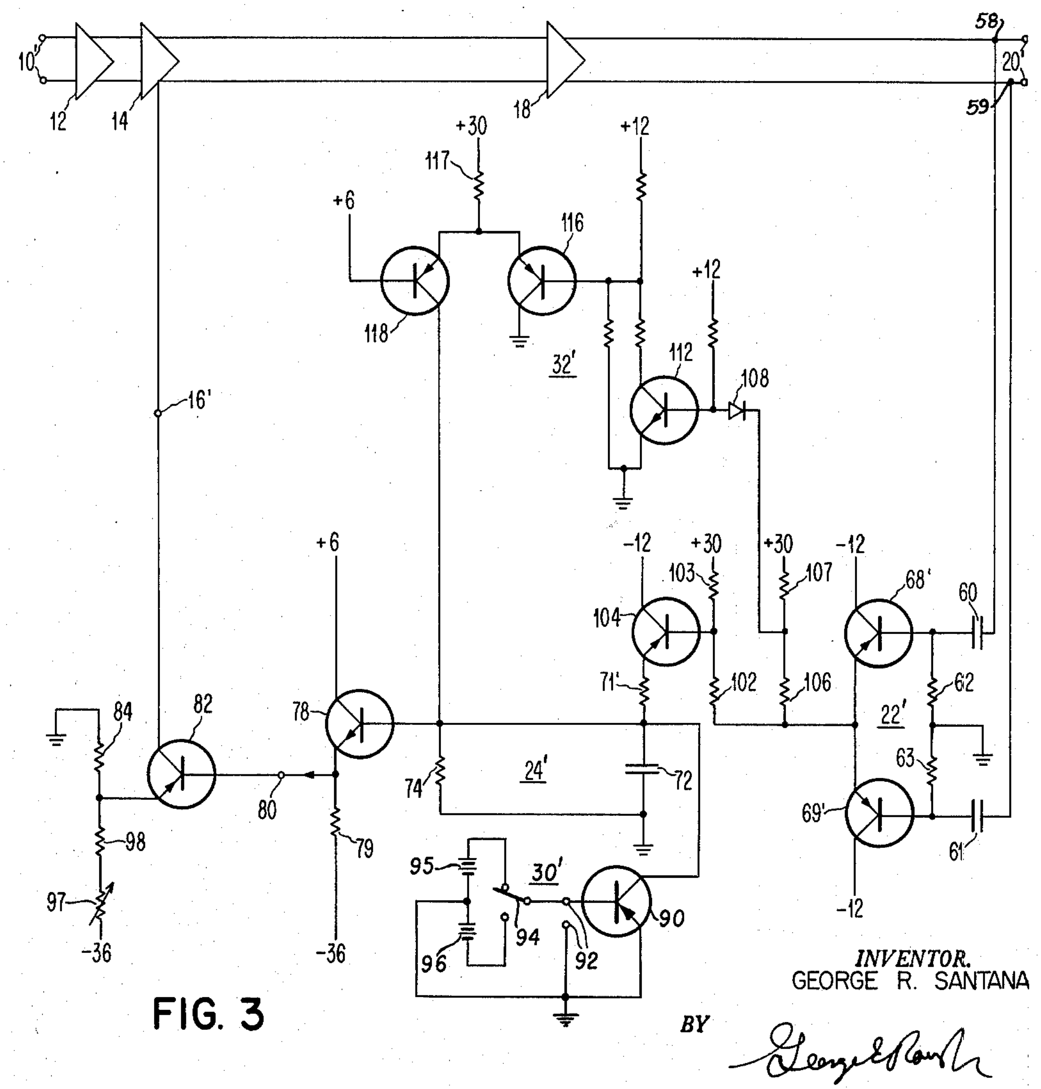
FIG. 3 is an advanced embodiment of an AGC voltage deriving circuitry according to the invention.

The problem of switching transients in the arrangement shown in FIG. 3, is preferably handled exactly as in the arrangement shown in FIG. 2 with a discharging transistor 90 as previously described connected to discharge the storing capacitor 72 as shown in FIG. 3.

The data below is offered, as a guide only, in the interest of enabling the artisan to practice the invention with the minimum of designing. These data are taken from practical embodiments of the invention constructed along the lines of the circuitry shown in FIGS. 2 and 3.

*Passive components*

| Ref. No. | Component | Value | Unit |
|---|---|---|---|
| 44, 44 | Resistor | 422 | Ohm. |
| 45, 45 | do | 12.1 | Kilohm. |
| 46, 47 | Capacitors | 3300 | mmfd. |
| 48, 49 | Resistor | 6.81 | Kilohm. |
| 54 | do | 1.1 | Do. |
| 55 | do | 2.0 | Do. |
| 56, 57 | Capacitors | 0.1 | mfd. |
| 60, 61 | do | 0.2 | mfd. |
| 62, 63 | Resistor | 1.6 | Kilohm. |
| 64 | do | 2.2 | Do. |
| 65 | do | 0–1 | Do. |
| 66 | Capacitor | 1.0 | mfd. |
| 71 | Resistor | 330 | Ohm. |
| 71' | do | 200 | Do. |
| 72 | Capacitor | 0.27 | mfd. |
| 74 | Resistor | 20 | Kilohm. |
| 79 | do | 20 | Do. |
| 84 | do | 220 | Ohm. |
| 85 | do | 2.0 | Kilohm. |
| 86 | Capacitor | 1.0 | mfd. |
| 97 | Resistor | 0–20 | Kilohm. |
| 98 | do | 6.2 | Do. |
| 102 | do | 1.2 | Ohm. |
| 103 | do | 1.0 | Do. |
| 106 | do | 1.0 | Do. |
| 107 | do | 33 | Do. |
| 117 | do | 15 | Kilohm. |

*Active components*

| Ref. No. | Component | Type |
|---|---|---|
| 42, 43 | Transistors | IBM 033 |
| 52, 53 | Diode | IBM J |
| 68, 69 | Transistors | IBM 033 |
| 68, 69 | do | IBM 035 |
| 78 | Transistor | IBM 083 |
| 82 | do | IBM 033 |
| 90 | do | IBM 033 |
| 104 | do | IBM 033 |
| 108 | Diode | IBM J |
| 112 | Transistor | IBM 065 |
| 116 | do | IBM 015 |
| 118 | do | IBM 033 |

A source of positive 6 volts and negative 6 volts was used for the batteries 95 and 96.

The invention claimed is:

1. A pulse signal automatic gain control voltage deriving circuit arrangement, including
input terminals at which a pulse signal having undesired amplitude variations is presented,
output terminals at which said automatic gain control voltage is desired,
a rectifying circuit having an input coupled to said input terminals and an output,
a reference level setting circuit connected to the output of said rectifying circuit,
an isolating circuit having an input connected to said level setting circuit and an output connection,
a charging resistor and a charge storing capacitor connected in series in said output connection for storing a charge proportional to the output of said rectifying circuit,
a discharging resistor connected across said charge storing capacitor,
said discharging resistor having a value at which the discharging time constant is very much greater than the charging time constant of the resistance-capacitance combination thus formed,
another isolating circuit having an input connected across said charge storing capacitor and an output coupled to said output terminals,
another reference level setting circuit connected to the output of said rectifying circuit,
a diode switching element connected to said other reference level setting circuit,
a discharging electron flow controlling device having an output circuit connected in circuit to said capacitor and
an input circuit coupled to said diode switching element,
whereby said capacitor is discharged rapidly in the presence of signal pulses and relatively slowly in the absence of signal pulses.

2. A pulse signal automatic gain control voltage deriving circuit arrangement, including
input terminals at which a pulse signal having undesired amplitude variations including transients is presented,
output terminals at which said automatic gain control voltage is desired,
a rectifying circuit having an input coupled to said input terminals and an output,
a reference level setting circuit connected to the output of said rectifying circuit,
an isolating circuit having an input connected to said level setting circuit and an output connection,
a charging resistor and a charge storing capacitor connected in series in said output connection for storing a charge proportional to the output of said rectifying circuit,
a discharging resistor connected across said charge storing capacitor,
said discharging resistor having a value at which the discharging time constant is very much greater than the charging time constant of the resistance-capacitance combination thus formed,
another isolating circuit having an input connected across said charge storing capacitor and an output coupled to said output terminals,
an electron flow controlling device having output and common circuit electrodes connected to opposing terminals of said capacitor and input and said common circuit electrodes connected to a source of switching potential for selectively presenting a very low short circuiting impedance and a very high impedance across said capacitor,
another reference level setting circuit connected to the output of said rectifying circuit,
a diode switching element connected to said other reference level setting circuit,
a discharging electron flow controlling device having an output circuit connected in circuit to said capacitor and an input circuit coupled to said diode switching element,
whereby said capacitor is discharged rapidly in the presence of signal pulses and relatively slowly in the absence of signal pulses.

3. A pulse signal automatic gain control voltage deriving circuit arrangement, including
input terminals at which a pulse signal having undesired amplitude variations is presented,
output terminals at which said automatic gain control voltage is desired,
a full wave rectifying circuit having an input coupled to said input terminals and an output,
a reference level setting circuit connected to the output of said rectifying circuit,
an isolating emitter follower circuit having an input connected to said level setting circuit and an output connection,
a charging resistor and a charge storing capacitor connected in series in said output connection for storing a charge proportional to the output of said rectifying circuit,
a discharging resistor connected across said charge storing capacitor,
said discharging resistor having a value at which the discharging time constant is very much greater than the charging time constant of the resistance-capacitance combination thus formed,
another emitter follower isolating circuit having an input connected across said charge storing capacitor and an output coupled to said output terminals,
another reference level setting circuit connected to the output of said rectifying circuit,
a diode element connected to said other reference level setting circuit,
a discharging transistor having an output circuit comprising base and collector electrodes connected in circuit across said capacitor and an input circuit including an emitter electrode coupled to said diode element through a cascaded transistor amplifying circuit, comprising
a grounded emitter transistor having a base electrode connected to said diode element, a grounded collector transistor having a base electrode coupled to the collector of said grounded emitter transistor and an emitter electrode connected to the emitter electrode of said discharging transistor,
whereby said capacitor is discharged rapidly in the presence of signal pulses and relatively slowly in the absence thereof.

4. A pulse signal automatic gain control voltage deriving circuit arrangement, including
input terminals at which a pulse signal having undesired amplitude variations including transients is presented,
output terminals at which said automatic gain control is desired, a full wave rectifying circuit having an input coupled to said output terminals and an input, a reference level setting circuit connected to the output of said rectifying circuit, an isolating emitter follower circuit having an input connected to said level setting circuit and an output connection, a charging resistor and a charge storing capacitor connected in series in said output connection for storing a charge proportional to the output of said rectifying circuit, a discharging resistor connected across said charge storing capacitor, said discharging resistor having a value at which the discharging time constant is very much greater than the charging time constant of the resistance-capacitance combination thus formed, another emitter follower isolating circuit having an input connected across said charge storing capacitor and an output coupled to said output terminals, an electron flow controlling device having output and common circuit electrodes connected to opposing terminals of said capacitor and input and said common circuit electrodes connected to a source of switching potential selectively presenting a very low short circuiting impedance and a very high impedance across said capacitor, another reference level setting circuit connected to the output of said rectifying circuit, a diode element connected to said other reference level setting circuit, a discharge transistor having an output circuit comprising base and collector electrodes connected in circuit across said capacitor and an input circuit including an emitter electrode coupled to said diode element through a cascaded transistor amplifying circuit, comprising a grounded emitter transistor having a base electrode connected to said diode switching element, a grounded collector transistor having a base electrode coupled to the collector of said grounded emitter transistor and an emitter electrode connected to the emitter electrode of said discharging transistor, whereby said capacitor is discharged rapidly in the presence of signal pulses and relatively slowly in the absence of signal and reset on either condition of signal.

5. A pulse signal automatic gain control voltage deriving circuit arrangement, including input terminals at which a pulse signal having undesired amplitude variations is presented, output terminals at which said automatic gain control voltage is desired, a rectifying circuit having an input coupled to said input terminals and an output, a charging resistor and a charge storing capacitor connected in series to the output of said rectifying circuit for storing a charge proportional to the output of said rectifying circuit, a discharging resistor connected across said charge storing capacitor, said discharging resistor having a value at which the discharging time constant is very much greater than the charging time constant of the resistance-capacitance combination thus formed, an impedance matching emitter-follower circuit coupled across said capacitor and having output terminals, means to establish reference potential, potential comparing means coupled to said reference potential establishing means and coupled between said impedance matching circuit and said output terminals, thereby completing an automatic gain control voltage deriving circuit arrangement, and a semiconductive electron flow controlling device having output circuit electrodes connected across said charge storing capacitor and having input circuit electrodes, and switching means coupled to said input circuit electrodes for applying potential across said input circuit electrodes for abruptly discharging said charge storing capacitor.

6. A pulse signal automatic gain control voltage deriving circuit arrangement, including input terminals at which a pulse signal having undesired amplitude variations is presented, output terminals at which said automatic gain control is desired, a full wave rectifying circuit having an input coupled to said input terminals and an output, a reference level setting circuit connected to the output of said rectifying circuit, an isolating emitter follower circuit having an input connected to said level setting circuit and an output connection, a charging resistor and a charge storing capacitor connected in series in said output connection for storing a charge proportional to the output of said rectifying circuit, a discharging resistor connected across said charge storing capacitor, said discharging resistor having a value at which the discharging time constant is very much greater than the charging time constant of the resistance-capacitance combination thus formed, another emitter follower isolating circuit having an input connected across said charge storing capacitor and an output coupled to said output terminals, means to establish reference potential, potential comparing means coupled to said reference potential establishing means and interposed between said isolating circuit and said output terminals, another reference level setting circuit connected to the output of said rectifying circuit, a diode element connected to said other reference level setting circuit, a discharge transistor having an output circuit comprising base and collector electrodes connected in circuit across said capacitor and an input circuit including an emitter electrode, a grounded emitter transistor having a base electrode connected to said diode switching elements, and a grounded collector transistor having a base electrode coupled to the collector of said grounded emitter transistor and an emitter electrode connected to the emitter electrode of said discharging transistor, whereby said capacitor is discharged rapidly in the presence of signal pulses and relatively slowly in the absence of signal.

References Cited by the Examiner

UNITED STATES PATENTS

| | | | |
|---|---|---|---|
| 2,799,735 | 7/57 | Breckman et al. | 330—130 X |
| 2,866,151 | 12/58 | Applin et al. | 323—66 X |
| 2,928,073 | 3/60 | Greanias | 328—173 X |
| 2,935,688 | 5/60 | Croly et al. | 328—173 |
| 3,032,704 | 5/62 | Beck | 323—66 |
| 3,089,082 | 5/63 | Little | 323—66 |

JOHN W. HUCKERT, *Primary Examiner.*

NATHAN KAUFMAN, *Examiner.*